D. C. TURNER.
Seeding Machine.

No. 105,389.   Patented July 12, 1870.

United States Patent Office.

DON C. TURNER, OF MADISON, WISCONSIN.

Letters Patent No. 105,389, dated July 12, 1870.

IMPROVEMENT IN SEEDING-MACHINES.

The Schedule referred to in these Letters Patent and making part of the same.

*To all whom it may concern:*

Be it known that I, DON C. TURNER, of Madison, in the county of Dane and State of Wisconsin, have invented a new and useful Improvement in Seeding-Machines; and I do hereby declare the following to be a full, clear, and exact description of the same, which will enable others skilled in the art to which my invention appertains to make and use the same, reference being had to the accompanying drawings forming part of this specification, in which—

Similar letters of reference indicate corresponding parts in the several figures of the drawings.

My invention has for its object to provide a more simple and economical means for converting a seeding-machine, at one operation, or at will, either into a grain-drill or broadcast-seeder, whereby grain may be sown in accordance with the character of the ground prepared to receive it.

My invention consists—

First, in a sliding frame or bottom, composed of wood, or other suitable material, provided with holes corresponding to those formed in the bottom of the hopper, and located beneath the latter in such a manner that, when moved toward the front of the machine, the seed from the hopper shall drop through the holes formed in said frame directly into the drill-spouts, and, when moved backward, shall fall in front of said spouts.

It consists, secondly, in the combination with the sliding perforated frame, of broadcast spouts, plates, or guides, adapted to slide with the frame or bottom, so that, when the same is moved backward beneath the hopper, the grain from the latter shall be guided into the broadcast spouts for broadcast sowing.

It consists, lastly, in the combination of the sliding perforated frame and sliding broadcast spouts, with the hopper and frame of the machine, as will be hereinafter more fully described.

In the accompanying drawings—

A is the frame of a seeding-machine, mounted upon wheels, or not, as may be desired, and to which are attached plows, hoes, or cultivator-teeth, in the ordinary manner.

B is the hopper, placed transversely of the frame, and provided with holes through the bottom, at such a distance apart as it is desired to have between the drills.

C C are the drill-spouts, arranged upon the frame to incline alternately to the front and rear, as shown.

D is a frame, board, or bottom, placed immediately beneath the hopper B, and parallel thereto.

It is provided with holes, arranged to register with those formed in the bottom of the hopper, and to its front edge are attached the broadcast spouts E.

Figure 3:
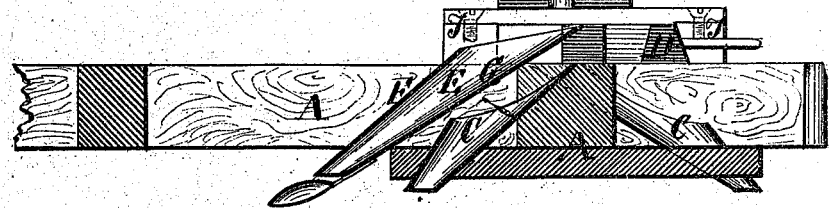
Figure 3 is a detail plan view of the perforated frame and broadcast spouts.
Figure 3:
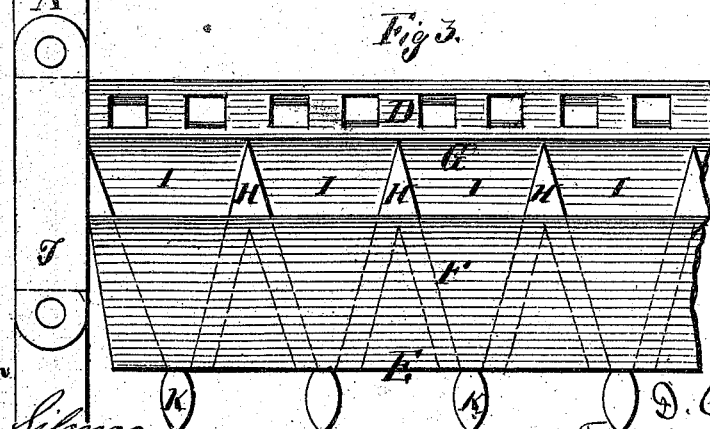

These spouts are formed of two inclined metallic or other plates, F G, held from contact with each other by the wooden bars H, which are inclined somewhat, to form channels I, wider at the top than at the bottom, as clearly shown in fig. 3.

If desired, the plate F and the inclined bars H may be removed from the plate G, leaving the latter only as an apron for sowing broadcast. It may, in the capacity of an apron, be made either plain, or corrugated transversely to form channels for the seed.

The frame D is adapted to be moved to the front and rear beneath the hopper, carrying with it the broadcast spouts.

The frame is limited, in its movement, by the stops J J, affixed to the sides of the frame A of the machine, and supporting the hopper.

The operation is as follows:

When it is desired to drill the grain into the ground, the frame D and its broadcast spouts are moved forward, by any suitable means; so that the holes in the frame shall register with those in the bottom of the hopper. In this position the seed falls from the hopper directly through the frame into the drill-spouts C, and is drilled into the ground in the ordinary manner.

Figure 1:
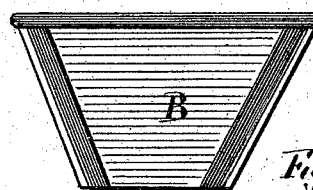
Figure 1 is a detail vertical longitudinal section of my improved seeding-machine adjusted for operation as a grain-drill.
Figure 2:
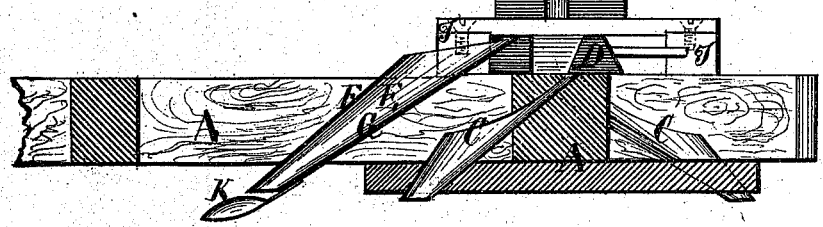
Figure 2 is a similar view of the same in position for sowing broadcast.
Figure 2:
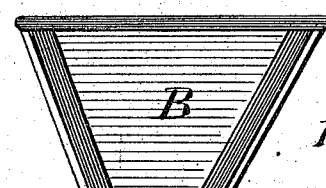

When, however, it becomes necessary or desirable to sow the seed broadcast, the frame D is moved backward until the upper edge of the plate or apron G is in rear of the holes in the bottom of the hopper, as shown in fig. 2, when the seed from said hopper will fall directly into the broadcast spouts E.

K are scatterers, affixed to the lower ends of the broadcast spouts, and serve to scatter the seed evenly upon the ground.

The frame D is of sufficient width to occupy the space between the hopper and the drill-spouts C, and thus prevent a blast of air from coming in contact with and scattering the grain during its passage from the hopper to the drill-spouts.

By my invention, a seeding-machine can be converted either into a drill or broadcast seeder, at the will of the driver, in the most expeditious and complete manner.

Having thus described my invention,

What I claim as new, and desire to secure by Letters Patent, is—

1. The sliding bottom D, provided with holes corresponding with those formed in the hopper B, and placed beneath said hopper in such a manner that, when moved toward the front of the machine, the seed from the hopper shall drop through the holes into the drill-spouts, and, when moved backward, shall fall directly in front of said spouts, substantially as herein shown and described.

2. In combination with the sliding perforated frame D, the broadcast spouts, plates, or guides, adapted to slide with the frame D, and constructed as herein shown and described, for the purpose specified.

3. In combination with the hopper B and frame A of the machine, the sliding perforated frame D, and sliding broadcast spouts, plates, or guides, constructed as herein shown and described, for the purpose specified.

D. C. TURNER.

Witnesses:
JAMES ROBY,
EDW. B. FORMAN.